(12) United States Patent
Agache et al.

(10) Patent No.: US 8,746,048 B2
(45) Date of Patent: Jun. 10, 2014

(54) DEVICE FOR THE GRAVIMETRIC DETECTION OF PARTICLES IN A FLUID MEDIUM, COMPRISING AN OSCILLATOR BETWEEN TWO FLUID CHANNELS

(75) Inventors: Vincent Agache, St Martin le Vinoux (FR); François Baleras, St Georges de Commiers (FR); Olivier Constantin, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 483 days.

(21) Appl. No.: 12/993,513

(22) PCT Filed: Apr. 24, 2009

(86) PCT No.: PCT/FR2009/000486
§ 371 (c)(1),
(2), (4) Date: Feb. 7, 2011

(87) PCT Pub. No.: WO2009/141515
PCT Pub. Date: Nov. 26, 2009

(65) Prior Publication Data
US 2011/0138891 A1    Jun. 16, 2011

(30) Foreign Application Priority Data
May 20, 2008 (FR) ..................... 08 02744

(51) Int. Cl.
G01N 29/02 (2006.01)
(52) U.S. Cl.
USPC ....................................... 73/61.75

(58) Field of Classification Search
USPC ................ 73/24.03, 24.06, 61.75, 61.79, 579
See application file for complete search history.

(56) References Cited

U.S. PATENT DOCUMENTS

| 5,306,644 A | 4/1994 | Myerholtz et al. |
| 5,744,902 A | 4/1998 | Vig |
| 2007/0119232 A1* | 5/2007 | Konno et al. ................. 73/24.01 |

FOREIGN PATENT DOCUMENTS

| EP | 1 059 521 A2 | 12/2000 |
| WO | WO 00/20850 | 4/2000 |

OTHER PUBLICATIONS

International Search Report and Written Opinion for International Application No. PCT/FR2009/000486, dated Sep. 18, 2009.

* cited by examiner

*Primary Examiner* — John Chapman, Jr.
(74) *Attorney, Agent, or Firm* — Alston & Bird LLP (57) ABSTRACT

The invention provides a device for the gravimetric detection of particles in a fluid medium, comprising a flat electromechanical oscillator (1), means for supporting the oscillator, means (15a, 15b, 15c, 15d) for actuating said oscillator and, on either side of the plane of the oscillator (1), two cavities (3, 5) enabling the oscillator (1) to vibrate when it is activated by the actuation means (15a, 15b, 15c, 15d), characterized in that at least one of the two cavities (3, 5) forms an integral part of a channel (2, 4) for the passage of a fluid over at least one of the faces (1a, 1b) of the oscillator and in that said actuation means (15a, 15b, 15c, 15d) take the form of at least one electrode (15a, 15b, 15c, 15d) lying in the same plane as that of the electromechanical oscillator and at a defined distance (g) from the oscillator, so as to ensure that the oscillator vibrates in its plane.

29 Claims, 7 Drawing Sheets

DEVICE FOR THE GRAVIMETRIC DETECTION OF PARTICLES IN A FLUID MEDIUM, COMPRISING AN OSCILLATOR BETWEEN TWO FLUID CHANNELS

FIELD OF THE INVENTION

The present invention relates to the technical field of the gravimetric detection in a fluid medium (liquid, gaseous) from resonant structures of the NEMS/MEMS (Nano-Electro-Mechanical System/Micro-Electro-Mechanical System) types.

BACKGROUND OF THE INVENTION

This gravimetric detection generally relies on the detection of variations in the vibration frequency of an electromechanical oscillator when a molecule is deposited on its surface.

Any oscillator subjected to a vibration force in turn enters into vibration. At certain frequencies, specific to each oscillator, the vibration amplitude is maximal. These frequencies are called "resonance frequencies". Thus, subjecting an oscillator to a vibration of a frequency equal to one of its resonance frequencies makes it possible to detect the deposition of a particle on the oscillator. In practice, this deposition modifies the vibration frequency of the oscillator which therefore no longer vibrates at a resonance frequency. The vibration amplitude is then reduced and can easily be detected. The minimum amplitude difference that can be detected determines the resolution of the detection device, in other words the minimum detectable weight of a particle being deposited on the oscillator.

This method can be used to:
detect the presence of a molecule,
detect the weight of the molecule,
characterize the kinetics of association/dissociation of a molecule with a complementary molecule recognition element (antibodies, nucleic acid probes or even printed polymer) previously intentionally grafted onto the surface of said oscillator.

This invention therefore relates to the field of methods for the direct detection, without marking, of biological or chemical events.

Many documents describe gravimetric detection sensors based on NEMS/MEMS oscillators.

Thus, it is possible to cite works in which use is made of a mass sensor in the form of a fixed-fixed beam made of silicon carbide, made to vibrate by magnetostatic transduction.

Throughout the description, the term "beam" will be understood to mean an elongate part, substantially horizontal, the thickness and the width of which are of the same order of magnitude (ratio between approximately 0.8 and 1.2), which are relatively low relative to the length of the beam.

This sensor has made it possible to detect and weigh xenon atoms, deposited in a high vacuum ($10^{-10}$ torr) and at very low temperature (4.2° K), on the surface of the sensor. Such a sensor exhibits a resolution of the order of seven zeptograms (zg) and a mass sensitivity of the order of 0.96 Hz/zg.

The highly restrictive conditions of operation of this sensor make it difficult, or even impossible, to use for biological purposes because the magnetostatic transduction is low in an aqueous medium and the powerful vacuum is incompatible with in vivo measurements.

Also known are a number of works regarding gravimetric detection with electromechanical oscillators working in an aqueous medium. Thus, it is possible to cite the article by T. Adrega et al., "Resonance of electrostatically actuated thin-film amorphous silicon microelectromechanical systems microresonators in aqueous solutions: Effect of solution conductivity and viscosity", *J. Appl. Phys.* 2007, 101, 094308. This article describes a fixed-fixed beam set to vibrate off-plane, and the resonance frequency of which is measured through an optical detection. The quality factor of such a structure is relatively low since it is of the order of 3, given the volume of liquid that is displaced by the structure set in motion and the significant mechanical stressing of the anchor points. Moreover, this structure is bulky because the fixed-fixed beam is in the form of a bridge under which is arranged an actuation electrode. This bulk is further increased by the presence of the detection means, in this case a laser source and a photodiode.

Also worth citing are the works regarding the use of a cantilevered beam-type electromechanical oscillator. The results of these works are explained in detail in the article by J. Teva et al., "A femtogram resolution mass sensor platform based on SOI electrostatically driven resonant cantilever. Part II: Sensor calibration and glycerine evaporation rate measurement", *Ultramicroscopy* 2006, 106, 808-814. A microdroplet of glycerine is deposited accurately on this oscillator, then resonance frequency measurements are performed to follow the speed of evaporation of the droplet. This method, which consists in extracting a weight variation from a frequency measurement, entails a preliminary step for calibration of the mass sensitivity based on latex balls.

It is not possible to consider that the oscillator is placed in a liquid medium during the measurement, since only a droplet is deposited at the end of the oscillator, the rest of the detector being kept in a dry medium. The use of the device described in this article by Teva has therefore never been validated in an aqueous medium. The use of such an oscillator for biological purposes cannot therefore be envisaged because it is necessary, in this case, to extract a reaction kinetic in real time and therefore, generally, in an aqueous medium.

Finally, other works can be cited which have consisted in incorporating a biological solution to be analyzed within the oscillator itself. These works are explained in detail in the article by S. Manalis et al., "Weighing of biomolecules, single cells and single nanoparticles in fluid", *Nature* 446, Apr. 26, 2007, (7139): 1066-1069.

The oscillator is in the form of a cantilevered beam in which there is provided a fluid stream tightly isolated from the medium in which the oscillator, of which it forms part, is actuated. This oscillator is set to vibrate by electrostatic coupling at 220 kHz and in a powerful vacuum, whereas the biological solution to be analyzed flows within the integrated fluid stream. In this configuration, a quality factor of 15 000 is obtained, and remains unchanging whether the channels are filled with air or with liquid. These works have made it possible to follow the reaction kinetics of an antibody-antigen recognition, for an antigen concentration of 100 ng.ml$^{-1}$, which places this type of device at the same rank as the best quartz balances in terms of resolution.

These works do, however, have limitations, lying notably in the detection method employed. In practice, it implements an optical detection using a laser and an external photodiode, which contribute to the overall bulk of the system.

It emerges from this presentation that there is currently no device for gravimetric detection that implements a cost-effective NEMS/MEMS oscillator, allowing for a detection of particles in a liquid medium, in conditions that are compatible with biological analyses, offering a high quality factor and a reduced bulk.

SUMMARY OF THE INVENTION

The object of the invention is to overcome these drawbacks by proposing a device for the gravimetric detection of particles in a fluid medium that simultaneously provides a high quality factor, easy conditions of use, a reduced bulk and a low production cost.

To this end, the subject of the invention is a device for the gravimetric detection of particles in a fluid medium, comprising a flat electromechanical oscillator, support means for the oscillator and actuation means for said oscillator, said device also including, either side of the plane of the oscillator, two cavities enabling the oscillator to vibrate when it is activated by the actuation means, at least one of the two cavities forming an integral part of a channel for the passage of a fluid over at least one of the faces of the oscillator, and said actuation means are arranged to ensure that the oscillator vibrates in its plane.

Throughout the description, the expression "flat oscillator" will be understood to mean a wafer having a length and a width that are large relative to its thickness (ratio greater than 2), the length and the width preferably being of the same order of magnitude.

According to other features of the invention:
- the device may comprise two cavities and two separate channels, each of the cavities forming an integral part of one of said channels for the passage of the fluid over each of the faces of the oscillator;
- the electromechanical oscillator may have a shape taken from a disk, a ring and a polygon, preferably a square;
- said actuation means may be in the form of at least one electrode arranged in the same plane as that of the electromechanical oscillator, and at a determined distance from the oscillator;
- the oscillator may be square-shaped and have a width and a thickness such that the ratio of the width to the thickness is between approximately 10 and 30, and preferably approximately 10;
- the oscillator may be a polygon and the support means may be arranged at at least one vertex of the oscillator;
- in the case of a square electromechanical oscillator, the support means may be arranged at the four vertices of said oscillator;
- the support means may be in the form of solid parts, such as blocks;
- at each vertex of the oscillator, the support means may include a fork comprising a handle and two teeth, oriented in the extension of a diagonal of the oscillator passing through said vertex, the teeth being linked to a solid part;
- at each vertex of the oscillator, the support means may include a beam oriented in the extension of a diagonal of the oscillator passing through said vertex, the beam being linked to a solid part;
- said electromechanical oscillator may be obtained from a metallic substrate;
- said electromechanical oscillator may be obtained from a polycrystalline substrate;
- said electromechanical oscillator may be obtained from a monocrystalline substrate;
- the substrate may be silicon-based;
- said monocrystalline substrate may be oriented in the crystallographic plane (100) or, alternatively, in the crystallographic plane (110);
- at least one of said faces of the flat oscillator may be at least partially covered with molecule recognition elements; and/or
- at least one of the two cavities and/or the channel or channels contains pillars whose transverse cross section is of a shape taken from a circle, an ellipse and a polygon.

This device may, notably, be used to form a diagnosis at the very bedside of the sick person, for the real time monitoring of physiological parameters in the case of an in vivo implantation (for example: dosing of HbAlc glycosylated hemoglobin for the treatment of diabetes and preventing or stopping the development of ocular, renal or neurological complications), or for the detection of toxic and pathogenic species in air or in water.

The invention also relates to a method of producing an above device, comprising the following steps:
- selection of a substrate that is appropriate to the planned gravimetric detection,
- production, from said substrate, of an electromechanical oscillator in the form of a wafer,
- production of a first cavity facing one of the faces of the oscillator,
- production of a second cavity facing the other face of the oscillator, said oscillator being suspended between the two cavities; and
- production of a first channel, of which one of the first and second cavities forms an integral part, for the passage of the fluid over one of the faces of said oscillator.

The above method may also include a step for producing a second channel, independent of the first channel, of which the other of the cavities forms an integral part, for the passage of the fluid over the other face of said oscillator.

The invention also relates to a method for the gravimetric detection of particles in a fluid medium, implemented with a flat electromechanical oscillator, comprising the following steps:
a) generating a fluid flow including the particles to be detected, in the first channel, to bring the fluid into contact with one of the faces of the oscillator;
b) setting the oscillator to vibrate at an initial frequency and according to a determined vibration mode;
c) detecting the vibration frequency of the oscillator;
d) detecting a modification of the frequency relative to the initial vibration frequency of the oscillator.

By convention, the steps of this method are carried out in alphabetical order.

According to other features of the invention:
- the method may also include a step a1) in which a fluid flow including particles to be detected is also generated in a second channel to bring the fluid also into contact with the other of the two faces of the oscillator;
- the method may include a step e) for the recovery and processing of detection data generated in the steps c) and d);
- the initial vibration frequency may be a resonance frequency of the oscillator;
- the vibration mode may be taken from the group consisting of the Lamé vibration mode, the volume extension vibration mode, the so-called "wineglass" vibration mode, an off-plane vibration mode and a bending mode;
- the method may employ a square oscillator and four electrodes each arranged facing one of the sides of the oscillator, the vibrating of the oscillator provided for in the step b) possibly being preceded by a step b1) in which at least two consecutive electrodes are powered with sinusoidal fields in phase opposition and at a determined frequency (f) characteristic of the particles to be detected;
- the step b1) may be preceded by a step b0) in which the fluid flow is stopped; and/or
- the method may include a step a0) prior to the step a), in which at least one surface of said oscillator is at least partially covered by molecule recognition elements.

Finally, the invention relates to a method of determining interaction kinetics between a molecule and a complementary molecule recognition element, using the above gravimetric detection method, and including a step d') for detection of a new modification of the frequency corresponding to a return to the value of the initial frequency of the oscillator, this step d') being carried out after the step d).

BRIEF DESCRIPTION OF THE DRAWINGS

Other features of the invention will emerge from the following detailed description, given with reference to the figures which represent, respectively.

DETAILED DESCRIPTION OF THE INVENTION

Figure 1:
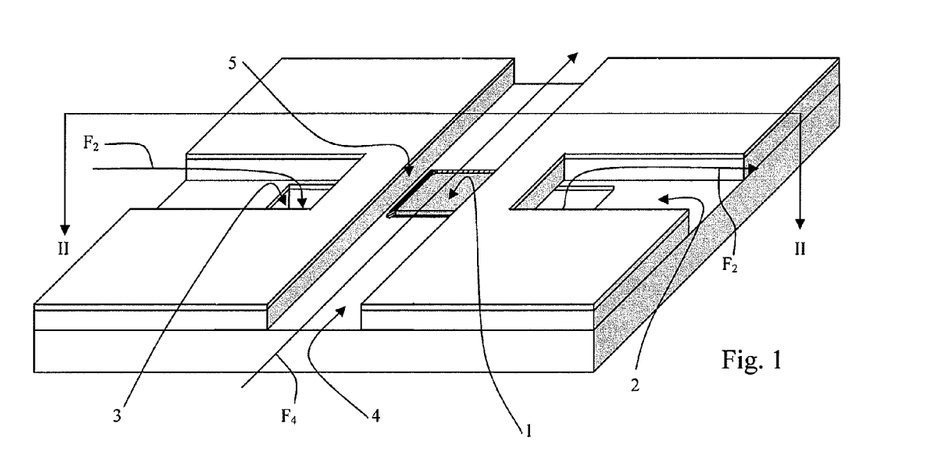
FIG. 1, a perspective schematic view of a portion of a gravimetric detector according to the invention, in which the wafer-type oscillator is self-supporting at the intersection of two channels.
Figure 2:
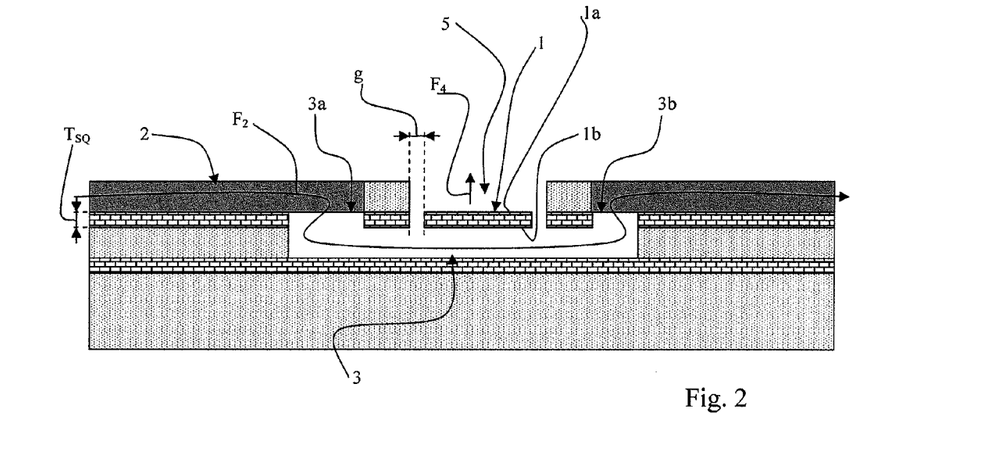
FIG. 2, a cross-sectional schematic view of the detector of FIG. 1 along the line II-II.

Referring to FIG. 1, a gravimetric detection device according to the invention comprises a flat electromechanical oscillator 1 above which is arranged a cavity 5 forming an integral part of a channel 4 for fluid circulating in this channel 4 according to the arrow $F_4$ to come into contact with the face 1a (see FIG. 2) of the oscillator 1.

A second cavity 3 is arranged below the oscillator 1 to enable it to vibrate. In this embodiment, the cavity 3 forms an integral part of another channel 2, independent of the channel 4, for fluid circulating in this channel 2 according to the arrow $F_2$ to come into contact with the face 1b (see FIG. 2) of the oscillator 1. According to another embodiment, not illustrated, the cavity 3 may not form an integral part of a channel that is independent of the channel 4. It is, however, in fluid communication with the channel 2 because of the structure of the detection device which will be described hereinbelow.

Figure 3:
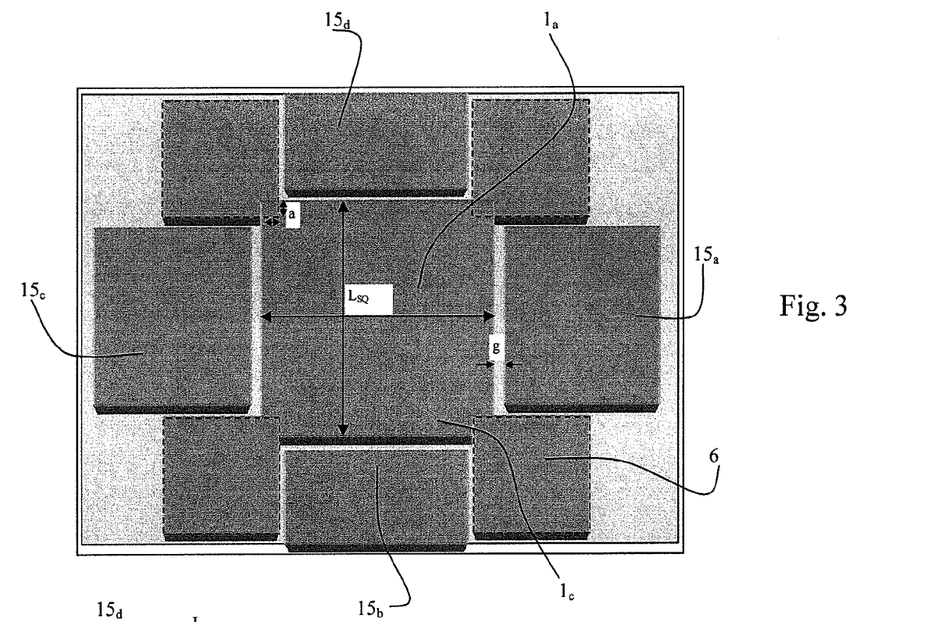
FIG. 3, a schematic plan view of a detector according to the invention provided with suspension means for the oscillator according to a first embodiment.

In order to be able to vibrate in its plane and above the cavity 3, the device comprises support means for the oscillator and actuation means (see FIG. 3).

According to the invention, the flat electromechanical oscillator is a wafer of a shape chosen from a disk, a ring and a polygon. According to a preferred embodiment, the electromechanical oscillator is square-shaped and has a width $L_{sq}$ (see FIG. 3) and a thickness $T_{sq}$ (see FIG. 2), such that the ratio of the width to the thickness $L_{sq}/T_{sq}$ is between 10 and 30, preferably 10. In this way, the wafer exhibits a vibratory behavior that is different from a membrane.

Figure 4:
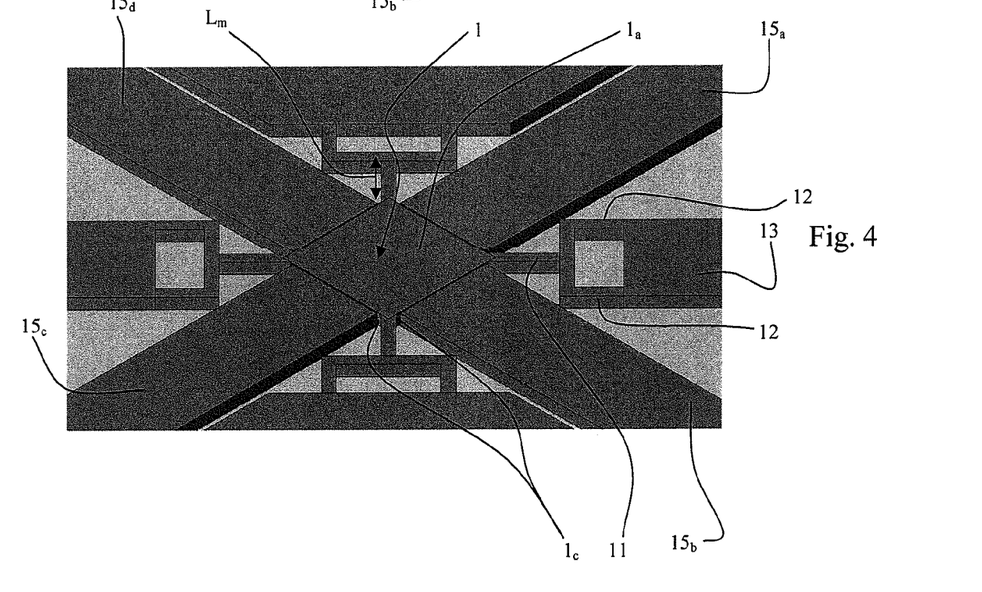
FIG. 4, a perspective schematic view of a detector according to the invention provided with suspension means for the oscillator according to a second embodiment.

In the embodiments illustrated in FIGS. 3 and 4, the support means are distributed at the four vertices of the oscillator 1. These support means may be in the form of solid parts such as blocks 6 (FIG. 3), or in the form of a fork 10 comprising a handle 11 and two teeth 12, oriented in the extension of the diagonal of the square wafer passing through said vertex, the teeth 12 of the fork being linked to a solid part 13. The length $L_m$ of the handle 11 of the fork is chosen such that the handle can vibrate preferably in longitudinal extension, alternatively by lateral flexing, when the oscillator vibrates, preferably at a resonance frequency of the oscillator (Lamé mode, volume extension mode or so-called "wineglass" mode, if it is a ring or a disk for example).

Alternatively, another suspension means which is not represented in FIGS. 3 and 4 consists of a beam oriented in the extension of a diagonal of the wafer passing through one of its vertices (if it is a polygon), the beam being linked to a solid part.

The width "a" of contact between the blocks 6 or the handles 11 and the wafer 1 is chosen to solidly support the wafer, while altering as little as possible the vibration of the wafer according to the desired vibration modes. For this, the dimensioning observes the following condition: $a \leq L_{sq}/10$.

The actuation means are actuated and arranged relative to the oscillator so that said oscillator can start vibrating, in its plane, according to a determined vibration mode. Depending on the manner in which the actuation means are activated, the oscillator may vibrate according to different modes, such as the Lamé mode, the volume extension mode or the so-called "wineglass" mode, in particular for a circular or annular oscillator.

According to a preferred embodiment of the invention, the actuation means comprise four electrodes 15a, 15b, 15c and 15d arranged around the oscillator 1, each electrode being arranged in the same plane as that of the oscillator, facing each of the sides of the oscillator 1 and at a determined distance g (see FIG. 3). The distance g must be as small as possible. Its value is mainly limited by the resolution of the lithography tools and the thickness $T_{SQ}$ of the oscillator 1 (typically g is of the order of $T_{SQ}/10$ and greater than 100 nm). By virtue of this configuration, the oscillator is kept suspended above the cavity 3. Because of the presence of this distance g, the cavity 3 is in fluid communication with the channel 2 without forming an integral part thereof.

The oscillator 1 can be made to vibrate, in its plane, by electrostatic coupling, via at least one of the four electrodes 15a to 15d, or, in a preferred embodiment, two adjacent electrodes. By so doing, the gravimetric detector according to the invention exhibits a high quality factor (of the order of 100 in a liquid medium, even more) since the volume of fluid displaced during the vibration is smaller compared to that which would be displaced by a device comprising a fixed or cantilevered beam vibrating according to a vertical bending mode.

The oscillator 1 may also be made to vibrate outside of its plane and according to a bending mode. However, such an implementation will reduce the quality factor of the oscillator.

In order to miniaturize the various elements of the gravimetric detection device according to the invention, it is desirable to produce them using techniques for the micro- or nano-structuring of a substrate, the latter possibly consisting either of a layer of polysilicon deposited on a thermal oxide, or of an SOI (silicon on isolator) substrate. The latter substrate consists of two layers of monocrystalline silicon between which is arranged a layer of silicon dioxide ($SiO_2$).

Hereinafter in the present description, the exemplary embodiments will be described for a gravimetric detection device machined on SOI substrates oriented in the crystallographic plane (100). Alternatively, the SOI substrates used may be oriented in the crystallographic plane (110). One of the advantages of this technology is that it is less subject to the mechanical dissipation mechanisms than that of the polycrystalline materials (for example polysilicon) in which grain joint relaxation phenomena are often observed.

Thus, when an SOI substrate is used, the oscillator is fabricated so that the sides 1c of the wafer 1 and the electrodes 15a to 15d have a crystallographic orientation in the crystallographic direction <110>. The sides of the handle and of the two teeth of each fork of the suspension means then have an orientation in the crystallographic direction <100>.

Producing a gravimetric detection device according to the invention generally consists in:
  selecting an appropriate substrate for the production of a flat oscillator able to vibrate substantially in its plane,
  producing an electromechanical oscillator in the form of a wafer,
  producing a first cavity 3, possibly forming an integral part of a channel 2 for the passage of the fluid over the face 1b of the oscillator, then producing a second cavity 5 forming an integral part of a channel 4, independent of the possible channel 2, so as to enable the passage of the fluid over the other face 1a of the oscillator 1, the oscillator being suspended between the two cavities 3 and 5.

A preferred embodiment consists in fabricating the gravimetric detection device according to the invention using two SOI substrates. This exemplary embodiment is illustrated in FIGS. 5 to 14.

Figure 5:
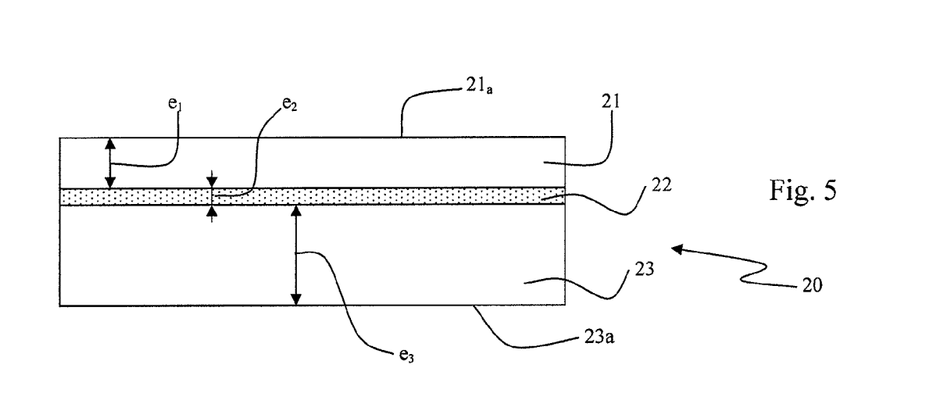
FIGS. 5 to 14, schematic views of substrates for a preferred method of fabricating a detector according to the invention at different steps in the production.

The first SOI substrate 20 illustrated in FIG. 5 comprises a top layer 21, preferably of highly resistive monocrystalline silicon ($\rho 1k\Omega.cm$), of a thickness $e_1$ greater than 5 micrometers (between 5 and 10 micrometers preferably). Under this layer 21 is arranged a buried layer 22 of $SiO_2$ with a thickness $e_2$ preferably of the order of 2 to 3 micrometers. Under this layer 22 of $SiO_2$ is arranged a bottom layer 23 of monocrystalline silicon, called "bottom handle", preferably highly resistive. This handle 23 has a thickness $e_3$ of the order of 500 to 750 μm preferably.

A first optional step of the method consists in producing alignment marks 24 on the rear face of the bottom handle, these marks allowing for a more accurate alignment of the two SOI substrates, as will be described hereinbelow.

Figure 6:
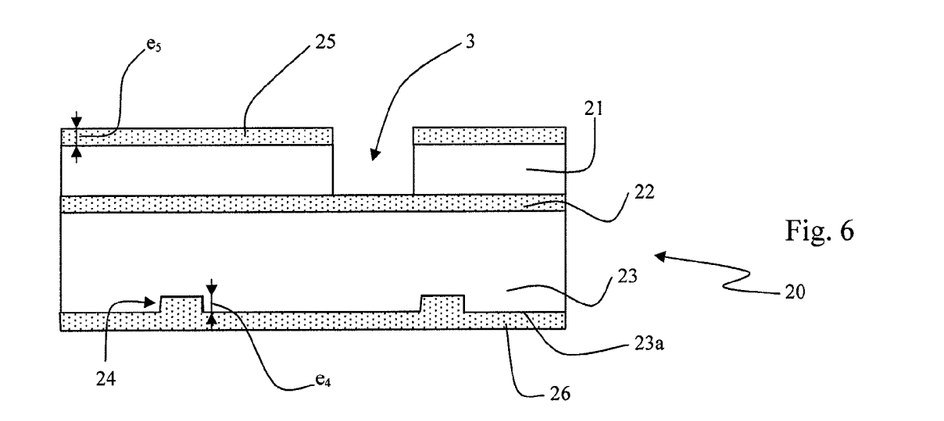

For this, a protection layer (aluminum, aluminum silicate, silicon oxide, etc.) is deposited on the external face 21a of the layer 21 of silicon. Then, a photosensitive resin is spread over the external face 23a of the handle 23 and a photolithography of the alignment marks is produced using a mask. The photosensitive resin layer is removed at the level of the marks, and the silicon layer of the handle is then etched to a determined thickness $e_4$ (FIG. 6). Then, the layer of photosensitive resin is removed from the external face 23a of the handle using an $O_2$ plasma and/or an appropriate chemical solution.

A second step consists in producing the cavity 3. The protection layer on the external face 21a is removed and a thermal oxidation of the substrate is produced on the external face 21a and the external face 23a. This thermal oxidation culminates in the production of a layer 25 of $SiO_2$ on the external face 21a and of a layer 26 of $SiO_2$ on the external face 23a, these two layers having a thickness $e_5$ of approximately 2 to 3 micrometers preferably. The layer 25 will serve as a seal with the second SOI substrate and allow for the vertical isolation of the future active parts (electrode, oscillator and its suspension means) relative to the substrate 20.

Then, a photosensitive resin is spread on the external face 21a, and the cavity 3, above which the future oscillator will be suspended, is defined by photolithography in this layer of photosensitive resin.

Plumb with the duly obtained patterns, the oxide layer 25 is then etched using a dry etching method as far as the layer 21 of monocrystalline silicon. The latter is then also etched, using a dry etching method, as far as the buried layer 22 of $SiO_2$. Finally, the photosensitive resin is removed (FIG. 6) and the substrate is cleaned with a dedicated chemical solution.

Figure 7:
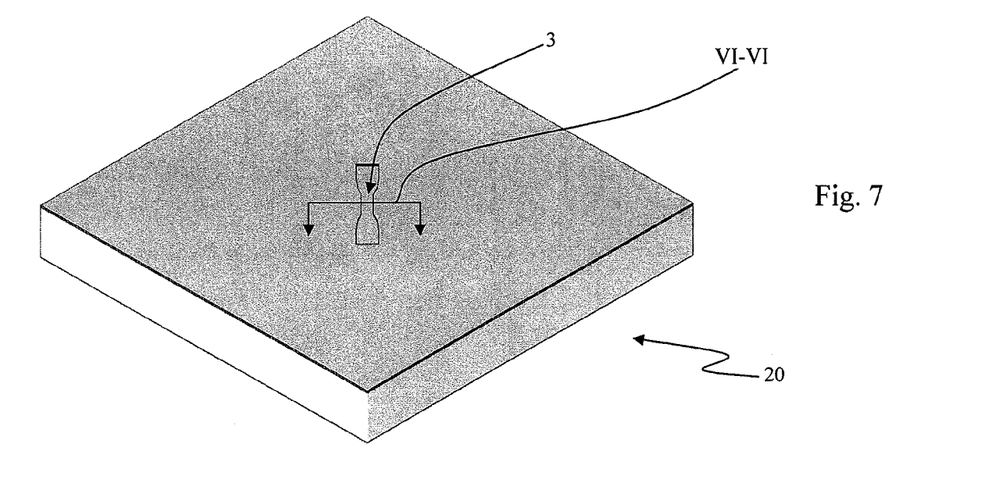

FIG. 7 is a perspective view of the first substrate after production of the cavity 3. FIG. 6 is a representation of the cross section VI-VI of FIG. 7. In this example, the cavity has a sufficient length for it to be able to be incorporated in the channel 2 in a subsequent step.

Figure 8:
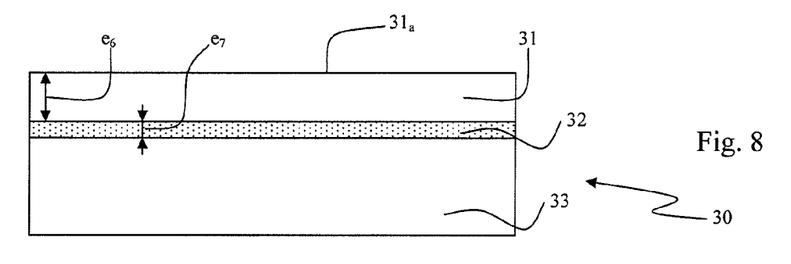
Figure 9:
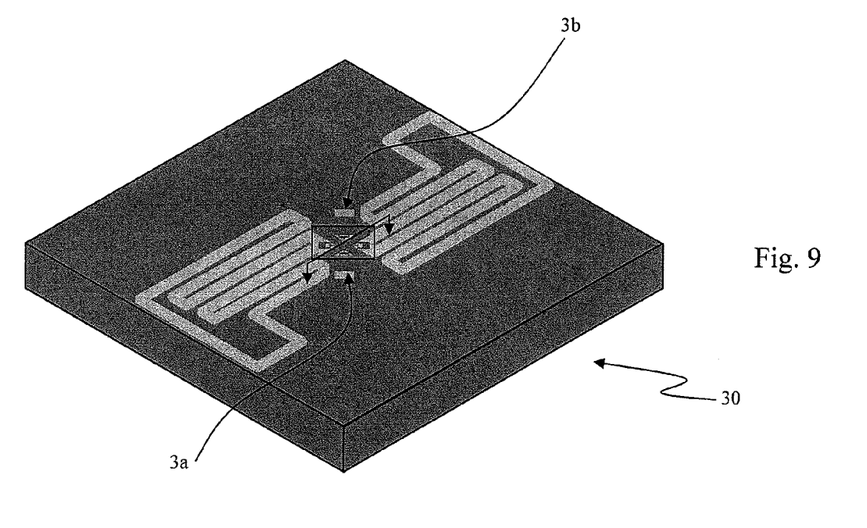
Figure 10:
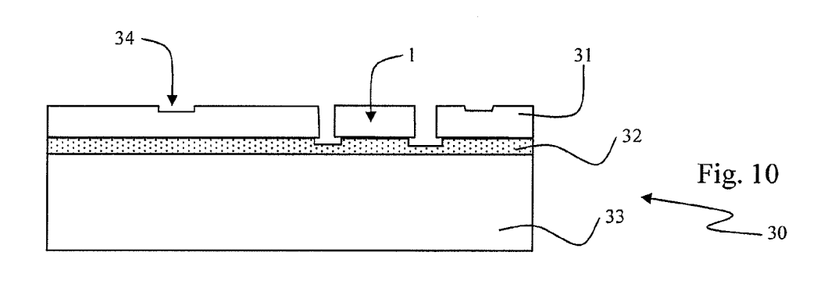

A third step, illustrated in FIGS. 8 to 10, consists in fabricating the active parts of the device, namely the oscillator in wafer form and the electrodes, as well as the support means. At least one of the support means may be linked to a bump contact enabling the oscillator to be electrically biased. These elements are fabricated in a second SOI substrate 30.

The latter comprises a top layer 31 of P or N type strongly doped monocrystalline silicon, preferably oriented in the crystallographic plane (100). This top layer 31 has a thickness $e_6$ of the order of 0.2 to 10 micrometers. Under this top layer is arranged a buried layer 32 of $SiO_2$ with a thickness $e_7$ of the order of 2 to 3 micrometers preferably. Finally, a bottom handle 33 of silicon oriented in the crystallographic plane (100) is arranged under the layer 32 of $SiO_2$.

According to a first embodiment, this third step comprises the following basic steps:
  α1) the external face 31a of the layer 31 of doped silicon undergoes a thermal oxidation, the duration of which determines the thickness of $SiO_2$. This duration is adjusted according to the doped silicon layer thickness to be etched to define the active parts; preferably, the thickness of the silicon layer to be etched 31 is of the order of 10 times the thickness of the deposited $SiO_2$ mask.
  α2) a photosensitive resin is spread over the external face 31a and alignment marks 34, which will be used for the sealing operation and the lithography of the active parts, are produced by photolithography.
  α3) the patterns are transferred by dry etching into the thermal oxide layer and into a part of the layer 31 of doped silicon.
  α4) the rest of the photosensitive resin is removed using an $O_2$ plasma and/or an appropriate chemical solution.
  α5) a new layer of photosensitive resin (or, alternatively, electrosensitive resin) is deposited on the thermal oxide layer, and the patterns, corresponding to the oscillator 1, to the suspension means and to the transduction electrodes, are produced by photolithography (or, alternatively, electronic lithography).
  α6) the thermal oxide layer is etched by plasma-based dry etching with a stop on the doped silicon layer.
  α7) the layer 31 of doped silicon is etched with a stop on the buried layer of silicon oxide 32 (by a dry etching method employing alternating cycles of etching of the silicon and passivation of the sides). The oscillator 1, the suspension means and the transduction elecrodes are then obtained in one and the same plane, that of the layer 31 of doped silicon.

α8) the rest of the photosensitive resin is removed using an O₂ plasma and/or an appropriate chemical solution.

α9) the rest of the thermal oxide layer is removed, preferably by chemical attack (BOE), which also partly begins the buried layer 32 of SiO₂.

α10) the substrate is cleaned with a view to sealing with the first substrate 20 using an appropriate chemical solution.

These steps culminate in the structured substrate 30 illustrated in FIGS. 9 and 10. The inset detail of FIG. 9 corresponds to the structure of FIG. 4 before metallization of the electrodes.

A second embodiment of this third step includes the following basic steps:

β1) a photosensitive resin is spread on the external face 31a and alignment marks are obtained by photolithography.

β2) the patterns are transferred by dry etching into a part of the doped silicon layer.

β3) the rest of the photosensitive resin is removed using an O₂ plasma and/or an appropriate chemical solution.

β4) a photosensitive or electrosensitive resin is spread and patterns are obtained by, respectively, photolithography or electronic lithography.

β5) the doped silicon layer is etched by dry etching with a stop in the buried silicon oxide layer.

β6) the rest of the resin is removed using an O₂ plasma and/or an appropriate chemical solution.

β7) the substrate is cleaned with a view to sealing with the first substrate using a dedicated chemical solution.

Figure 11:
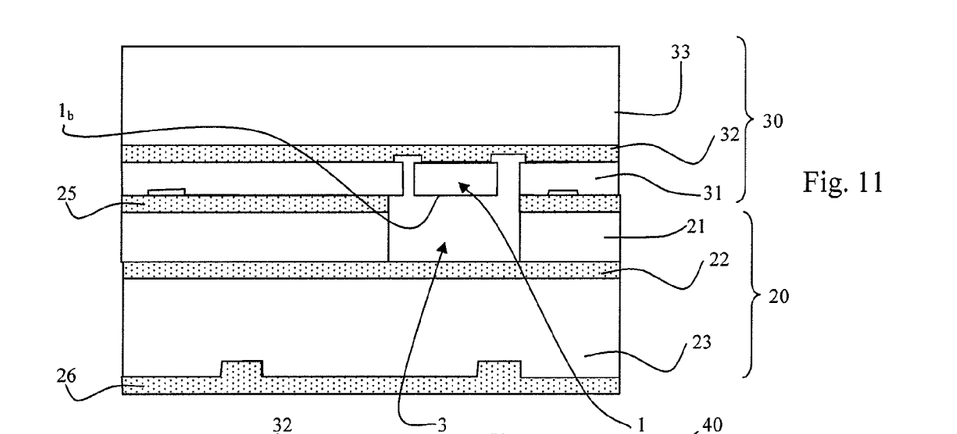
Figure 12:
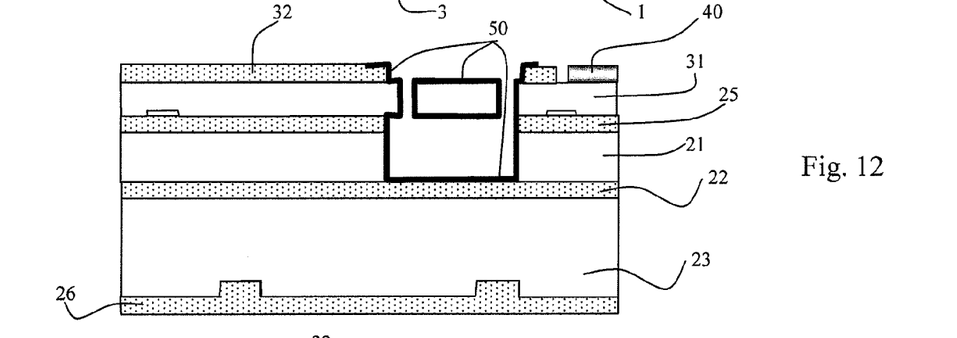
Figure 13:
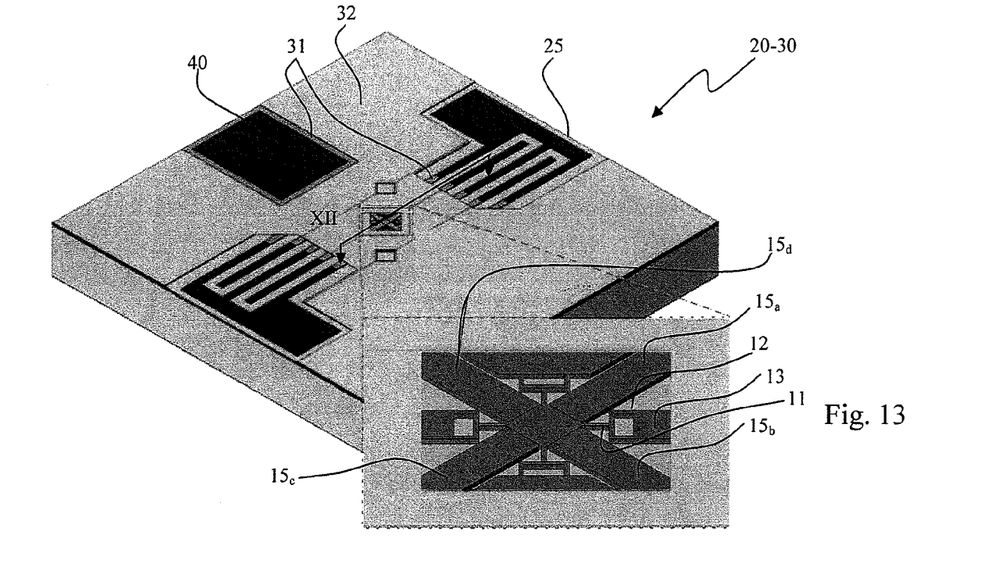

Once these substrates 20 and 30 have been structured, they are positioned using the alignment marks 24-34 then sealed to one another, the external face 21a of one against the external face 31a of the other (FIG. 11). The layer 33 of monocrystalline silicon of the second substrate 30 is thinned then polished (mechanical/chemical polishing and possible finishing with a solution of tetramethylammonium hydroxide) with a stop on the buried SiO₂ layer 32. In an alternative embodiment, the layer 33 of silicon may be partially thinned.

Then, using known photolithography and etching techniques, the buried layer 32 of SiO₂ is removed in places in order to be able to subsequently replace electrical contacts on the layer of silicon 31 and bias the active parts. This step also makes it possible to clear away SiO₂ to create access areas 3a and 3b between the cavity 3 and the channel 2. At the end of the etching of the SiO₂, the rest of the resin is removed using an O₂ plasma and/or an appropriate chemical solution.

A metallic layer 40 is then deposited on the layer 31 of doped silicon, and removed selectively using known photolithography and etching techniques, in order to form metallic bump contacts on the layer 31 of doped silicon at the periphery of the chip, that is to say in a manner that is remote from the areas that will be in contact with the liquid, said liquid being contained by the channels 2 and 4.

An electrically insulating layer 50 (Al₂O₃, HFO₂, SiO₂, etc.) is also deposited on the parts that will be intended to come into contact with the fluid.

The duly obtained structure (FIGS. 12 and 13) is partially covered, by a glue screen printing method, with a layer 60 in which is etched the channel 4, this layer 60 being topped by a cover 61 (FIGS. 14 and 15), made of Pyrex® or of glass. The detail of FIG. 13 corresponds to a structure similar to that of FIG. 4, but in which the oscillator, the suspensions and the electrodes are covered by the insulating layer 50.

Figures 14, 15, 16:
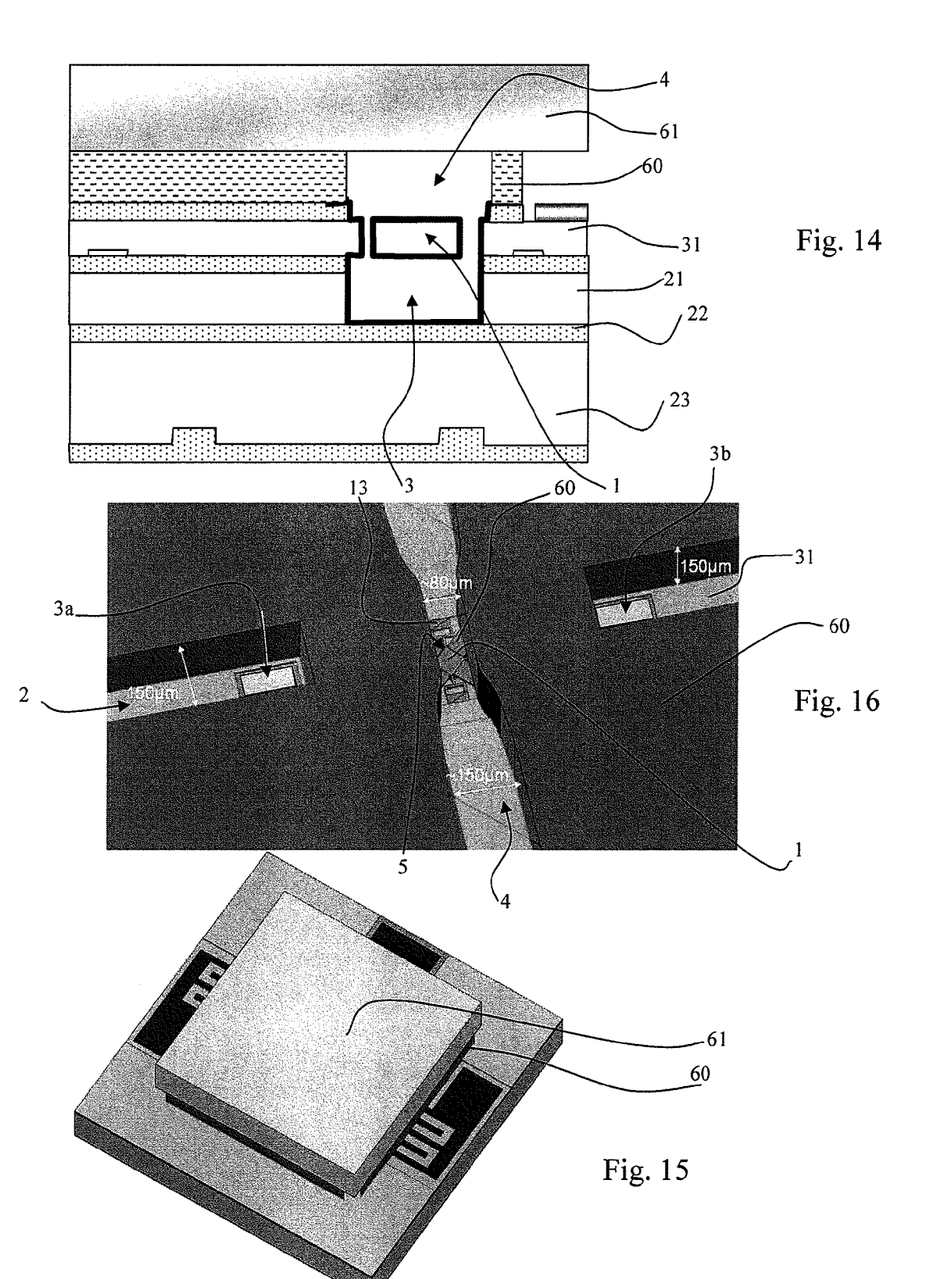
FIG. 15, a perspective schematic view of a detector according to the invention.
FIG. 16, a perspective schematic view of an enlargement of the detector of FIG. 15 from which the transparent cover has been removed.

The layer 60, which includes the channel 4, may consist either of highly resistive silicon or of a biocompatible photosensitive film. The assembly, on the one hand, of the structure 20-30 supporting the oscillator 1 and of the layer 60 supporting the channel (FIG. 16) and, on the other hand, of the cover 61 made of Pyrex® (possibly previously machined) makes it possible to obtain the gravimetric detection device according to the invention (FIG. 15).

An alternative fabrication method consists in producing two cavities, only one of which forms an integral part of a channel. An example of such a method is described hereinbelow, with reference to FIG. 19. It offers the advantage of being economical since it is preferably carried out with a single SOI substrate 70 from which will be fabricated the active parts of the device, namely the oscillator in wafer form, the electrodes and the support means. At least one of the support means may be linked to a bump contact allowing the oscillator to be electrically biased.

Figures 18, 19:
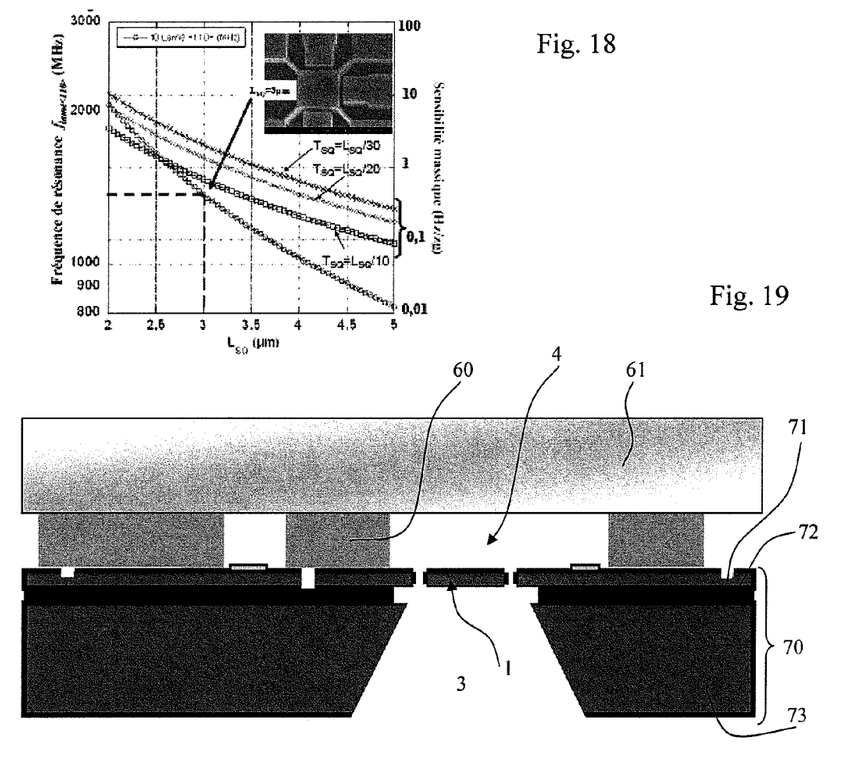
FIG. 18, a graph illustrating the theoretical mass sensitivity of a detector according to the invention, as a function of the width of the oscillator and of the ratio of this width to the thickness of said oscillator.
FIG. 19, a schematic view of a detector according to the invention obtained by an economical fabrication mode.

This SOI substrate 70 comprises a top layer 71 of P or N type strongly doped monocrystalline silicon preferably oriented in the plane (100). This top layer has a thickness preferably of the order of 0.2 to 10 micrometers. Under this top layer is arranged a buried layer of SiO₂ 72 preferably with a thickness of the order of 2 to 3 micrometers. Finally, a bottom handle 73, made of silicon oriented in the plane (100), is arranged under the buried SiO₂ layer.

A first optional step consists in producing alignment marks by photolithography and dry etching in the top silicon layer 71.

Then, a protection resin is deposited on the doped silicon layer 71.

A lithography is then carried out to define the patterns delimiting the active parts (oscillator, electrodes, etc.). These patterns are transferred by dry etching (by a method employing alternating cycles of etching of the silicon and of passivation of the sides) into the doped silicon layer 71 with a stop in the buried silicon oxide layer 72. The oscillator 1, the suspension means and the transduction electrodes are then obtained in one and the same plane, that of the doped silicon layer 71. The protection resin is then removed, using an O₂ plasma and/or an appropriate chemical solution.

A high temperature oxide (HTO) is then deposited by the LPCVD (low pressure chemical vapor deposition) technique, thus covering the two faces of the SOI substrate 70 and filling the air gaps formed during the previous etching of the doped silicon layer 71. The thickness of this oxide HTO is preferably greater than 500 nm.

A new step for lithography and etching of the oxide layer HTO with a stop on the doped silicon layer 71 makes it possible to define the electrical contact patterns located at the periphery of the device, and remotely sited from the parts that must be in contact with the liquid, then the resin used for the lithography is removed.

The front face of the SOI substrate (free face of the oxide layer HTO and free parts of the silicon layer 71) is then covered by a conductive layer of AlSi at least 2 μm thick, deposited by spraying.

A photolithography step is then implemented to define the mask for obtaining the electrodes. After exposure to light and removal of the exposed areas of the resin, the AlSi layer is locally removed by chemical etching. After removal of the protection resin, an oxide approximately 4.25 μm thick of TEOS type is deposited by PECVD (plasma enhanced chemical vapor deposition) on the front face of the substrate. The oxide TEOS designates a silicon oxide (SiO2) obtained by low pressure chemical vapor deposition, from a precursor of tetraethylorthosilicate (TEOS) type. This step is then followed by a deposition of silicon-enriched nitride, also by PECVD.

A protection of the front face is then produced by a resin enduction on the latter, followed by a step for partial thinning and polishing of the rear face of the substrate (free face of the silicon layer 73).

After removal of the protection resin, silicon-enriched nitride is deposited on the rear face of the substrate by PECVD, followed by a lithography and dry etching of the nitride on the rear face to produce a cavity 3. A KOH (potassium hydroxide) etching with a stop on the buried oxide layer 72 is then used to define the oxide $SiO_2$ support means for supporting the oscillator and a part of the electrodes.

The nitride is then etched, preferably using an appropriate chemical solution, or alternatively removed from the front face of the substrate by dry etching. The oscillator is then defined, or even "released", by etching the buried oxide layer 72 using BOE (buffered oxide etchant) or HF (hydrofluoric acid) in vapor phase.

A "high-k" (high permittivity) oxide is then deposited by the ALD (atomic layer deposition) method: oxide of $Al_2O_3$ or $HFO_2$ type.

Finally, in the same way as in the preferred embodiment described previously, this etched substrate 70 is covered, by a glue screen printing method, with a layer in which is etched the channel 4, this layer 60 being topped by a transparent cover 61 made of glass or Pyrex®.

The layer 60, which includes the channel 4, may consist either of highly resistive silicon or of a biocompatible photosensitive film.

A method for the gravimetric detection of particles in a fluid medium according to the invention consists in employing the electromechanical oscillator described previously.

This employment comprises the following steps (by convention, the steps of the method below are carried out in alphabetical order):
 a) generating a fluid flow including the particles to be detected, in the first channel 4, to bring the fluid into contact with one of the faces of the oscillator 1;
 b) setting the oscillator 1 to vibrate at an initial frequency and according to a determined vibration mode;
 c) detecting the vibration frequency of the oscillator 1;
 d) detecting a modification of the frequency relative to the initial vibration frequency of the oscillator 1.

In the embodiment illustrated, the method comprises, in addition, the step a1) in which a fluid flow, including particles to be detected, is also generated in the second channel 2 to bring the fluid also into contact with the other of the two faces of the oscillator.

The vibrating of the oscillator at an initial frequency can be initiated according to several vibration modes. In a preferred embodiment of the invention, for which the oscillator would consist of a square wafer, by virtue of the arrangement of the electrodes facing each edge of the oscillator and in the same plane as the wafer, the vibration modes that can be exploited, with good results, are the Lamé vibration mode and the volume extension vibration mode (or so-called breathing mode). For a circular or annular oscillator, the preferred vibration mode is the so-called "wineglass" mode.

Preferably, the initial vibration frequency is a resonance frequency of the oscillator.

According to the Lamé vibration mode, the four vertices of the oscillator and its center constitute vibration nodes (zero displacement and minimal energy loss). The shear wave that is associated with this vibration mode is propagated along the diagonals of the oscillator, so that the deformations of two consecutive sides of the oscillator are phase-shifted by n relative to one another. The result of this is an isochoric mode, which allows for a significant reduction in the thermo-elastic losses through the structure made to vibrate, unlike in fixed beams (fixed-fixed or cantilevered) that are stressed by bending. In other words, the Lamé mode allows for a significant improvement to the quality factor because the vertices of the square oscillator constitute the vibration nodes. They thus undergo virtually no mechanical stress during the vibration, so that this vibration is not dissipated to the rest of the device. All the vibration is concentrated on the oscillator so that the least deposition of a molecule on its surface or removal of a molecule from its surface can be detected.

To obtain a vibration of the oscillator according to the Lamé mode, at least one electrode arranged facing an edge of the oscillator is powered using an alternating signal $v_{in}$, of resonance frequency $f_{in}$ corresponding to the expected Lamé mode. The oscillator is biased via one of its support means which is powered by a DC voltage signal $V_{DC}$, the role of which is to act on the amplitude of the electrostatic vibrating force, and on the value of the resonance frequency of the oscillator. In a preferred embodiment, to make the oscillator vibrate according to the Lamé mode, two electrodes (15a and 15b for example), situated facing two consecutive edges of the oscillator, are biased with the same signal $v_{in}$, but phase-shifted by n relative to one another, while the oscillator remains biased using the DC voltage signal $V_{DC}$. The vibration frequency is preferably detected by capacitive coupling via a current $I_{out}$ generated by modulating the transduction capacitance between the vibrating oscillator and the electrodes situated facing the electrodes powered by the alternating signal $v_{in}$ (see FIG. 17). Thus, the capacitive output current $I_{out}$ is measured at least on one of the electrodes 15c or 15d which is not controlled by the excitation signal $v_{in}$. In a preferred embodiment of the invention, this current $I_{out}$ results from the sum of two currents $I_{outs1}$ and $I_{out2}$, deriving from the capacitive coupling between the vibrating oscillator and two adjacent electrodes 15c or 15d which are not powered by the alternating signal $v_{in}$. The current $I_{outs1}$ is reversed before addition with the current $I_{out2}$.

In the volume extension vibration mode, the shape of the oscillator is retained (square) and its sides vibrate in phase (expanding and contracting) unlike in the Lamé mode for which two adjacent sides vibrate with a phase shift of n relative to one another.

To obtain a vibration in the volume extension mode, at least one electrode arranged facing an edge of the oscillator is powered by an alternating signal $v_{in}$, of resonance frequency $f_{in}$ corresponding to the expected volume extension mode, overlaid on a DC voltage signal $V_{DC}$, the role of which is to act on the amplitude of the vibrating electrostatic force, and on the value of the resonance frequency of the oscillator. In a preferred embodiment, to excite the volume extension mode, the four electrodes facing edges of the oscillator are biased with the same signal $v_{in}$, overlaid on a DC voltage signal $V_{DC}$. The vibration frequency is detected via a current $I_{out}$ detected on one of the support means 6 (see FIG. 17).

Thus, when the fluid circulates within the channels, and the oscillator vibrates at its resonance frequency, it is possible to observe a significant variation of the vibration frequency during the deposition of particles on the oscillator or, on the other hand, when particles are detached from the oscillator and are once again in solution.

The gravimetric detection method according to the invention includes a step e) for recovery and processing of detection data generated in the steps c) and d), these data being used to deduce, for example, the weight of the particles that have been deposited on the oscillator, or that have been detached from the latter and are once again in the fluid.

Two methods can be used to improve the detection of particles with the detection device according to the invention. These methods may be combined together.

A first method consists in at least partly covering, in a preliminary step a0), at least one surface of the oscillator with molecule recognition elements. These elements are specifically linked with the molecules that are to be detected and allow for a targeted detection of these molecules in a fluid also including molecules of different types.

Figure 17:
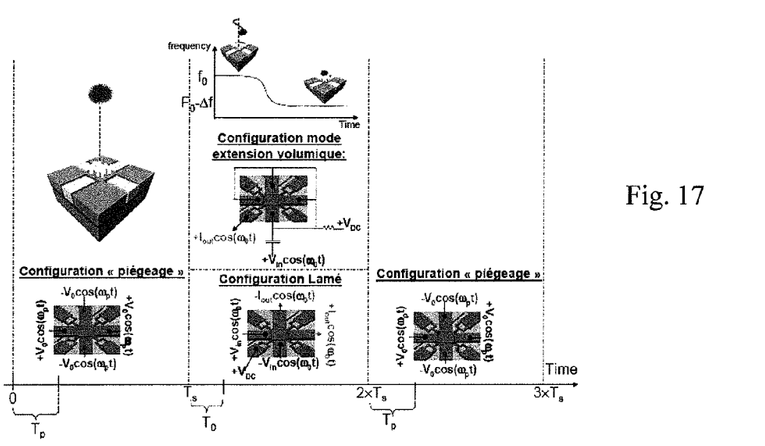
FIG. 17, a schematic representation of the control of the electrodes for the implementation of a gravimetric detection method according to the invention.

A second method, illustrated in FIG. 17, is based on the dielectrophoretic effect. This is allowed by the four-pole configuration of the electrodes of the device.

Thus, when the vibrating of the oscillator provided for in the step b) is preceded by a step b1) in which at least two consecutive electrodes are powered with sinusoidal fields in phase opposition and at a determined frequency (f) characteristic of the particles to be detected, and this is done during the time interval $[0; T_s]$, an entrapment phenomenon is obtained by keeping the particles that are to be detected in "levitation" above the oscillator.

Preferably, two facing electrodes are powered with sinusoidal fields at a determined frequency (f) characteristic of the particles to be detected, at the same potential $+V_0$, the other two electrodes being in phase opposition, at the potential $-V_0$ (so-called "alternating field" configuration). By so doing, the entrapment phenomenon is obtained above the center of the oscillator.

The step b1) is preferably preceded by a step b0) in which the fluid flow in the channel is stopped. This step b0) thus improves the entrapment.

Then, the electrodes are powered during the time interval $[T_S; 2T_S]$, so as to make the oscillator vibrate according to a determined vibration mode (Lamé mode, volume extension mode, wineglass mode if it is a disk or ring for example, or other). During this interval, the molecules are deposited on the oscillator since they are now neither driven by the fluid nor maintained in levitation by the electrical current.

The gravimetric detection method according to the invention can be used to determine an interaction kinetic between a molecule and a complementary molecule recognition element. In this case, the method consists, in a step d), in detecting a first modification of the vibration frequency of the wafer of the oscillator when the molecule is fixed to the molecule recognition element arranged on the surface of the wafer, then, in a step d'), in detecting a new modification of the frequency, corresponding to a return to the value of the resonance frequency of the oscillator, when the molecule is detached from the molecule recognition element. This step d') is performed after the step d) of the gravimetric detection method.

This interaction kinetics determination method can be exploited in the context of molecular dynamics to assess, for example, the association/dissociation constants between widely varying biomolecules: proteins, DNA, RNA, polysaccharides, lipids, even viruses and cells, and interactions including antigen-antibody, antibody-antibody, hormone-receptor, drug-receptor, enzyme-cofactor/inhibitor, protein-DNA, protein-RNA, DNA-DNA, lipoprotein-enzyme, protein-peptide, phages-antibodies, etc.

The gravimetric detection device according to the invention offers numerous advantages compared to the devices of the prior art consisting of fixed-fixed or cantilevered beams.

Thus, a device according to the invention allows greater latitude regarding the dimensions of the oscillator. In theory, the Lamé mode of a wafer with 3 µm sides (the sides of the wafer being parallel to the crystallographic planes (110)) should be obtained for a frequency of approximately 1.374 GHz. By comparison, according to the EULER-BERNOULLI theory, the dimensions of a fixed-fixed beam stressed in the plane would have to be brought to 640 nm length to 64 nm width to achieve the same frequency level.

The gravimetric detection device according to the invention also offers a mass sensitivity (corresponding to the vibration frequency variation per unit of weight) that has improved relative to a fixed-fixed beam. Thus, as the graph of FIG. 18 shows, a device according to the invention comprising a square oscillator having a width $L_{sq}$ of 2 µm sides and a thickness $T_{sq}$ of 200 nm or 66 nm (respectively curves $T_{sq}=L_{sq}/10$ and $T_{sq}=L_{sq}/30$), exhibits a mass sensitivity, respectively, of the order of 3.47 or 10.4 Hz/zg (HERTZ per zeptograms). By comparison, a fixed-fixed beam made of silicon carbide 2.3 µm long, 70 nm thick and 150 nm wide exhibits a sensitivity of 0.96 Hz/zg. Thus, a molecule of 1 zeptogram induces a frequency variation, in this example, from 3.6 to 10.8 times greater with the device according to the invention compared to the device of the prior art.

The device according to the invention also allows for a reduction in the energy losses through the surface of the oscillator. In practice, by comparison to a system that uses a fixed beam, the oscillator according to the invention has a less high surface area-to-volume ratio. This makes it possible to reduce the energy losses through the surface (adsorption, desorption of the molecules) which become predominant compared to the volume effects with the reduced size of the systems.

The gravimetric detection device according to the invention also exhibits a detection limit that is improved relative to the devices that use a fixed beam. Thus, the minimum weight that can be detected by an oscillator vibrating according to a volume extension mode is approximately thirty two times less than that of a fixed-fixed beam of the same length, thickness and structural materials as the oscillator. Therefore, given identical size, the resolution of the device according to the invention is improved compared to the prior art and, with identical resolution, a device according to the invention has very much greater dimensions compared to a fixed-fixed beam device, which makes it possible to use a less expensive fabrication technology.

Finally, a device according to the invention offers an improved probability of detection of a molecule.

In practice, one of the critical points of the detection lies in the minimum concentration of molecules that can be detected per time unit. In addition to the geometry of the fluid channel in which the molecules circulate, the minimum concentration depends on the accessible surface area of the oscillator.

As an example, a simulation was conducted with DNA strands consisting of 20 nucleotides present in a solution in concentration equivalent to 1 fM/liter (femtomole per liter).

With a fixed-fixed beam made of silicon carbide 10 µm long, 260 nanometers thick and 650 nanometers wide, the time for the first molecule to reach the surface of the beam is approximately 1 hour, whereas the time for the first molecule to reach the surface of the oscillator of a device according to the invention is approximately 6 minutes for an oscillator of length $L_{SQ}$ 8.25 µm (oscillator having a mass sensitivity equivalent to the fixed-fixed beam), and 30 minutes for an oscillator of length $L_{SQ}$ 2.565 µm (that is to say an oscillator having an effective weight equivalent to that of the fixed-fixed beam).

Thus, not only is the gravimetric detection device according to the invention more effective than an equivalent fixed-fixed beam, but it also allows for the use of larger size and therefore less expensive structuring techniques.

The structure of the oscillator in wafer form arranged between two cavities and around which are arranged four electrodes allows for a gravimetric detection of particles whose minimum detectable weight is approximately thirty two times smaller than that detected using devices of the prior art in fixed-fixed beam form.

Furthermore, the device according to the invention may be used in vivo and does not require a highly accurate deposition of the particles on the oscillator. In this case, the chip can be implanted in a man or an animal and the data are transmitted wirelessly to an external server.

Also, since the detection of the frequency variations is handled by the electrodes situated in the same plane as the oscillator, the detector according to the invention makes it possible to minimize the bulk of the system, notably if a CMOS cointegration is produced at the time of fabrication of the mobile structure, making it possible to incorporate the electronics for conditioning (transimpedance amplifier, phase shifter, etc.) and shaping the signal in the vicinity of the oscillator.

Finally, the oscillator according to the invention requires no calibration step, unlike the TEVA device.

According to other embodiments:
- at least one of the two cavities and/or the channel or channels contains pillars whose transverse cross section is of a shape taken from a circle, an ellipse and a polygon.
  For example, said pillars may be arranged upstream and/or downstream of the cavity 5. Upstream of the oscillator 1, they may be used to capture the molecules that are not of interest and that are brought by the channel 4. For this, the spacing between these pillars is adjusted so as to allow the molecules of interest, but not the other molecules, to circulate in the cavity 5, above the oscillator 1. Arranging pillars downstream of the oscillator makes it possible to reverse the direction of circulation of the fluid and thus to facilitate the use of the detection device according to the invention which does not depend on the direction of flow of the fluid. The same reasoning can be applied to the cavity 3 and to the channel 2.
  When the pillars are arranged on the oscillator in one and/or the other of the cavities, they are used to increase the available capture area for the grafting of the biological objects of interest, in order to increase the probability of capture and the sensitivity of the sensor. The height of the pillars should allow the oscillator to vibrate;
- the oscillator may be a polygon and the support means may be arranged at at least one vertex of the oscillator.

The invention claimed is:

1. A device for the gravimetric detection of particles in a fluid medium, comprising a flat electromechanical oscillator, support means for the oscillator, actuation means for said oscillator, and, either side of the plane of the oscillator, two cavities enabling the oscillator to vibrate when it is activated by the actuation means, characterized in that at least one of the two cavities forms an integral part of a channel for the passage of a fluid over at least one of the faces of the oscillator, and in that said actuation means are in the form of at least one electrode arranged in the same plane as that of the electromechanical oscillator, and at a determined distance (g) from the oscillator, so as to ensure that the oscillator vibrates in its plane, an electrically insulating layer being deposited on all parts intended to come into contact with the fluid.

2. The device as claimed in claim 1, comprising two cavities and two separate channels, each of the cavities forming an integral part of one of said channels for the passage of the fluid over each of the faces of the oscillator.

3. The device as claimed in claim 1, in which the electromechanical oscillator has a shape taken from a disk, a ring, a square, or a polygon.

4. The device as claimed in claim 3, in which the oscillator is a polygon and the support means are arranged at least one vertex of the oscillator.

5. The device as claimed in claim 4, in which, in the case of a square electromechanical oscillator, the support means are arranged at the four vertices of said oscillator.

6. The device as claimed in claim 1, in which the oscillator is square-shaped and has a width (Lsq) and a thickness (Tsq) such that the ratio of the width to the thickness (Lsq/Tsq) is between approximately 10 and 30.

7. The device as claimed in claim 1, in which the support means are in the form of blocks.

8. The device as claimed in claim 1, in which the oscillator includes one or more vertexes, and at each vertex of the oscillator, the support means include a fork comprising a handle and two teeth, oriented in the extension of a diagonal of the oscillator passing through said vertex, the teeth being linked to a solid part.

9. The device as claimed in claim 1, in which the oscillator includes one or more vertexes, and at each vertex of the oscillator, the support means include a beam oriented in the extension of a diagonal of the oscillator passing through said vertex, the beam being linked to a solid part.

10. The device as claimed in claim 1, in which said electromechanical oscillator is obtained from a metallic substrate.

11. The device as claimed in claim 1, in which said electromechanical oscillator is obtained from a polycrystalline substrate.

12. The device as claimed in claim 11, in which the substrate is silicon-based.

13. The device as claimed in claim 1, in which said electromechanical oscillator is obtained from a monocrystalline substrate.

14. The device as claimed in claim 13, in which said monocrystalline substrate is oriented in the crystallographic plane.

15. The device as claimed in claim 1, in which at least one of said faces of the flat oscillator is at least partially covered with molecule recognition elements.

16. The device as claimed in claim 1, in which at least one of the two cavities and/or the channel or channels) contains pillars whose transverse cross section is of a shape taken from a circle, an ellipse or a polygon.

17. The device as claimed in claim 1, wherein the insulating layer is made of $Al_2O_3$ or $HFO_2$.

18. A method of producing a device as claimed in claim 1, comprising the following steps:
  selection of a substrate that is appropriate to the planned gravimetric detection,
  production, from said substrate, of an electromechanical oscillator in the form of a wafer,
  production of a first cavity facing one of the faces of the oscillator,
  production of a second cavity facing the other face of the oscillator, said oscillator being suspended between the two cavities,
  production of a first channel, of which one of the first and second cavities forms an integral part, for the passage of the fluid over one of the faces of said oscillator, and
  production of actuation means arranged in the same plane as that of the oscillator, deposition of an electrically insulating layer on all parts intended to come into contact with the fluid.

19. The production method as claimed in claim 18, also including a step for producing a second channel, independent of the first channel, of which the other of the cavities forms an integral part, for the passage of the fluid over the other face of said oscillator.

20. A method for the gravimetric detection of particles in a fluid medium, implemented with an electromechanical oscillator as claimed in claim 1, comprising the following steps:
   a) generating a fluid flow including the particles to be detected, in a first channel, to bring the fluid into contact with one of the faces of the oscillator; wherein the oscillator includes an electrically insulating layer that is deposited on all parts intended to come into contact with the fluid
   b) setting the oscillator to vibrate in its plane at an initial frequency and according to a determined vibration mode;
   c) detecting the vibration frequency of the oscillator;
   d) detecting a modification of the frequency relative to the initial vibration frequency of the oscillator.

21. The gravimetric detection method as claimed in claim 20, implemented with an electromechanical oscillator comprising a flat electromechanical oscillator, support means for the oscillator, actuation means for said oscillator, and, either side of the plane of the oscillator, two cavities enabling the oscillator to vibrate when it is activated by the actuation means, characterized in that at least one of the two cavities forms an integral part of a channel for the passage of a fluid over at least one of the faces of the oscillator, and in that said actuation means are in the form of at least one electrode arranged in the same plane as that of the electromechanical oscillator, and at a determined distance (g) from the oscillator, so as to ensure that the oscillator vibrates in its plane, wherein the method includes a step a1) in which a fluid flow including particles to be detected is also generated in a second channel to bring the fluid also into contact with the other of the two faces of the oscillator.

22. The gravimetric detection method as claimed in claim 20, including a step e) for processing of data generated in the steps c) and d).

23. The gravimetric detection method as claimed in claim 20, in which the initial vibration frequency is a resonance frequency of the oscillator.

24. The gravimetric detection method as claimed in claim 20, in which the vibration mode is taken from the group consisting of the Lame vibration mode, the volume extension vibration mode, and the so-called "wineglass" vibration mode.

25. The gravimetric detection method as claimed in claim 20, employing a square oscillator and four electrodes each arranged facing one of the sides of the oscillator, in which the vibrating of the oscillator provided for in the step b) is preceded by a step b1) in which at least two consecutive electrodes are powered with sinusoidal fields in phase opposition and at a determined frequency (f) characteristic of the particles to be detected.

26. The gravimetric detection method as claimed in claim 25, in which the step b1) is preceded by a step b0) in which the fluid flow is stopped.

27. The gravimetric detection method as claimed in claim 20, including a step a0) prior to the step a), in which at least one surface of said oscillator is at least partially covered by molecule recognition elements.

28. A method of determining interaction kinetics between a molecule and a complementary molecule recognition element, using the gravimetric detection method as claimed in claim 20, and including a step d') for detection of a new modification of the frequency corresponding to a return to the value of the initial frequency of the oscillator, this step d') being carried out after the step d).

29. The method as claimed in claim 20, wherein the insulating layer is made of $Al_2O_3$ or $HFO_2$.

* * * * *